United States Patent [19]
Jurmu

[11] Patent Number: 6,086,088
[45] Date of Patent: Jul. 11, 2000

[54] AXLE CONSTRUCTION FOR A VEHICLE

[75] Inventor: Risto Jurmu, Pohjankuru, Finland

[73] Assignee: Tamrock Oy, Tampere, Finland

[21] Appl. No.: 09/043,186

[22] PCT Filed: Sep. 25, 1996

[86] PCT No.: PCT/FI96/00507

§ 371 Date: Sep. 2, 1998

§ 102(e) Date: Sep. 2, 1998

[87] PCT Pub. No.: WO97/12771

PCT Pub. Date: Apr. 10, 1997

[30] Foreign Application Priority Data

Sep. 29, 1995 [FI] Finland ..................... 954662

[51] Int. Cl.$^7$ .................. B60G 5/00; B60G 9/02
[52] U.S. Cl. ................... 280/682; 280/124.114
[58] Field of Search .................. 280/676, 680, 280/682, 124.11, 124.111, 124.116, 124.117, 124.114, 124.17, 137.5, FOR 114, FOR 125, FOR 129, FOR 184, 81.6, 86, 686, 677; 180/264, 266, 24.01

[56] References Cited

U.S. PATENT DOCUMENTS 1,952,400  3/1934  White .............................. 280/124.17
3,471,166  10/1969  Clark .............................. 280/676
4,995,634  2/1991  Evans .............................. 280/682
5,255,754  10/1993  Lauronen ......................... 180/24.01
5,492,351  2/1996  Salo ................................ 280/81.6

FOREIGN PATENT DOCUMENTS 2902728  8/1980  Germany .
9114587  10/1981  WIPO .
9305968  4/1993  WIPO .
9321029  10/1993  WIPO .

*Primary Examiner*—J. J. Swann
*Assistant Examiner*—Christopher Bottorff
*Attorney, Agent, or Firm*—Ladas & Parry

[57] ABSTRACT

A rigid axle is turnably supported from a vehicle and carries wheels at its ends. The axle is supported from the frame of the vehicle at each of its ends by a support member which is pivotably connected to the axle and has suspension members at its opposite ends pivotably connected thereat. The suspension member at the forward end of the support member extends upwardly from the support member and is pivotably connected at its upper end to the frame. The suspension member at the opposite end of the support member extends downwardly and is connected at its lower end to an equalizer lever connected to the frame or to a suspension member connected to a support member of a following axle.

8 Claims, 3 Drawing Sheets

CHANGE IN THE HEIGHT OF FRAME

AXLE CONSTRUCTION FOR A VEHICLE

FIELD OF THE INVENTION

The present invention relates to axle constructions for commercial vehicles, in particular lorries, trailers and mining vehicles. Axle constructions of this kind are known from Finnish Patents 84,895 and 89,570, for example.

DESCRIPTION OF THE PRIOR ART

Rigid steerable axles are used in especially heavy transports, in which it is necessary that one or some of the axles are steerable, as there are typically more than two such axles and as the turning radius of the vehicle is inadequate without steering. Rigid axles are used because of the heavy load and simple construction. It is also crucial that the load is evenly distributed on all axles in uneven terrain.

It is customary to use twin wheels with independent suspension, in which case the construction fulfils both the turning and load distribution requirements.

When turning axles according to the Finnish Patents cited above, in which support means or springs of the axle are supported to the frame of the vehicle or to equalizer levers secured thereto by means of suspension means extending downwards from the support means, the suspension means have to assume a slanted position, which will cause the frame of the vehicle to rise with great turning angles, in particular. This is because when turning axles, the support means or the springs move in the direction of the road surface, at the same time as the upper ends of the suspension means secured to their ends also move essentially only in the direction of road surface. When the suspension means move thus into a slanted position, their lower ends should be able to rise upwards. As the lower ends of the suspension means are secured to the frame or to equalizer levers attached to the frame, the frame will also have to rise. The suspension means has a tactile force in a direction from which a vertical force component bears the portion of the vehicle mass on the suspension rod, and a horizontal force component that resists turning. This property can sometimes be utilized as a torque that restores steering. However, when the turning angles of axle loads and axles are large, too much force is needed for turning, the force being directed to the support means or the springs horizontally, which causes extra strain.

SUMMARY OF THE INVENTION

The object of the present invention is to obviate the above-mentioned drawbacks. This object is achieved by means of the axle construction of the invention.

In accordance with the invention, by securing in a single-axle solution suspension means on one side of the axle upwards and the suspension means only on the other side downwards, that is, unsymmetrically, and in a solution of several axles at least at one axle in a similar way, the raising effect of the downwardly extending suspension means can be compensated by the lowering effect of the upwardly extending suspension means as desired by changing the measurements of the portions and the number of the upwardly extending suspension means. When turning an axle where suspension means are positioned unsymmetrically, the support means or the spring of the axle turns against the axle in the perpendicular plane, as when the upper end of the upwardly extending suspension means goes aslant, it attempts to raise the end of the support means or the spring and the lower end of the downwardly extending suspension means attempts to lower the opposite end of the support means or the spring. The force needed for turning the axle will diminish considerably as when the upwardly extending suspension means goes aslant, it causes a horizontal force component on the support means or the spring which affects in the opposite direction to the horizontal force component caused by the downwardly extending suspension means.

In the case that the support means or the springs are secured to the axle by means of joints that allow the axle to turn essentially in the horizontal plane with respect to the support means or the spring and the support means or the spring to rock with respect to the axle, as in the solution of Finnish Patent 89,570, the suspension means extending either upwards or downwards from the suspension means of the support means or the spring provided with unsymmetrically arranged suspension means should at each time be secured e.g. to the frame of the vehicle, to the support means or the spring or to the equalizer lever by means of a bearing that allows the suspension means to rotate only essentially in the longitudinal plane of the frame of the vehicle and essentially in the vertical plane with respect to the frame as in this case the forces operating in the suspension means do not any more always centre automatically the support means or the spring in line with the frame of the vehicle and the situation can change into a labile one. The opposite end of the suspension means should in this case mounted in bearings to move more freely, whereby in practice, it can be done more easily with a ball joint.

This bearing method provides another significant additional advantage to the construction: the suspension means, whose one fixture can rotate only in one plane, forces the movement of the support means or the spring sidewardly with respect to the frame of the vehicle, whereby the support means or the spring cannot collide onto the frame of the vehicle, the tire, etc. The space required for moving the support means or the spring can be calculated accurately, whereby the need for space will diminish and the turning angles of the axle can become greater, for example.

A bogie may comprise, and it normally does, more than two axles, and some of the axles may be dead, i.e. not steering. At least the following alternatives are obvious:

A bogie formed by two steerable axle.

A bogie formed by one steerable axle and one dead axle. An equalizer lever is used and the support means of the dead axle is supported at one end to the equalizer lever by means of a suspension means, its other end being supported to the frame in the same or another manner.

A bogie formed by two steerable axles and one dead axle. In this case, the dead axle may be positioned at either end of the bogie, whereby the situation is the same as above, except that the equalizer lever is used between the steering axles, or as the middle axle of the bogie, whereby the dead axle is sprung to both steering axles by means of equalizer levers.

A bogie formed by three steerable axles and one dead axle.

A bogie formed by one steerable axle and two dead axles.

A bogie formed by two steerable axles and two dead axles.

A bogie formed by three steerable axles and two dead axles.

A single steering axle, whereby the equalizer lever is omitted and the suspension means are secured to the points of attachment of the frame. This alternative is not a bogie construction even though the axle support and control in accordance with the invention are utilized.

It is to be understood that other alternatives can be realized by means of the bogie arrangement of the invention as well.

BRIEF DESCRIPTION OF THE DRAWINGS

In the following, the invention will be described in greater detail by means of two specific embodiments with reference to the attached drawings, where.

DETAILED DESCRIPTION

Figure 1:
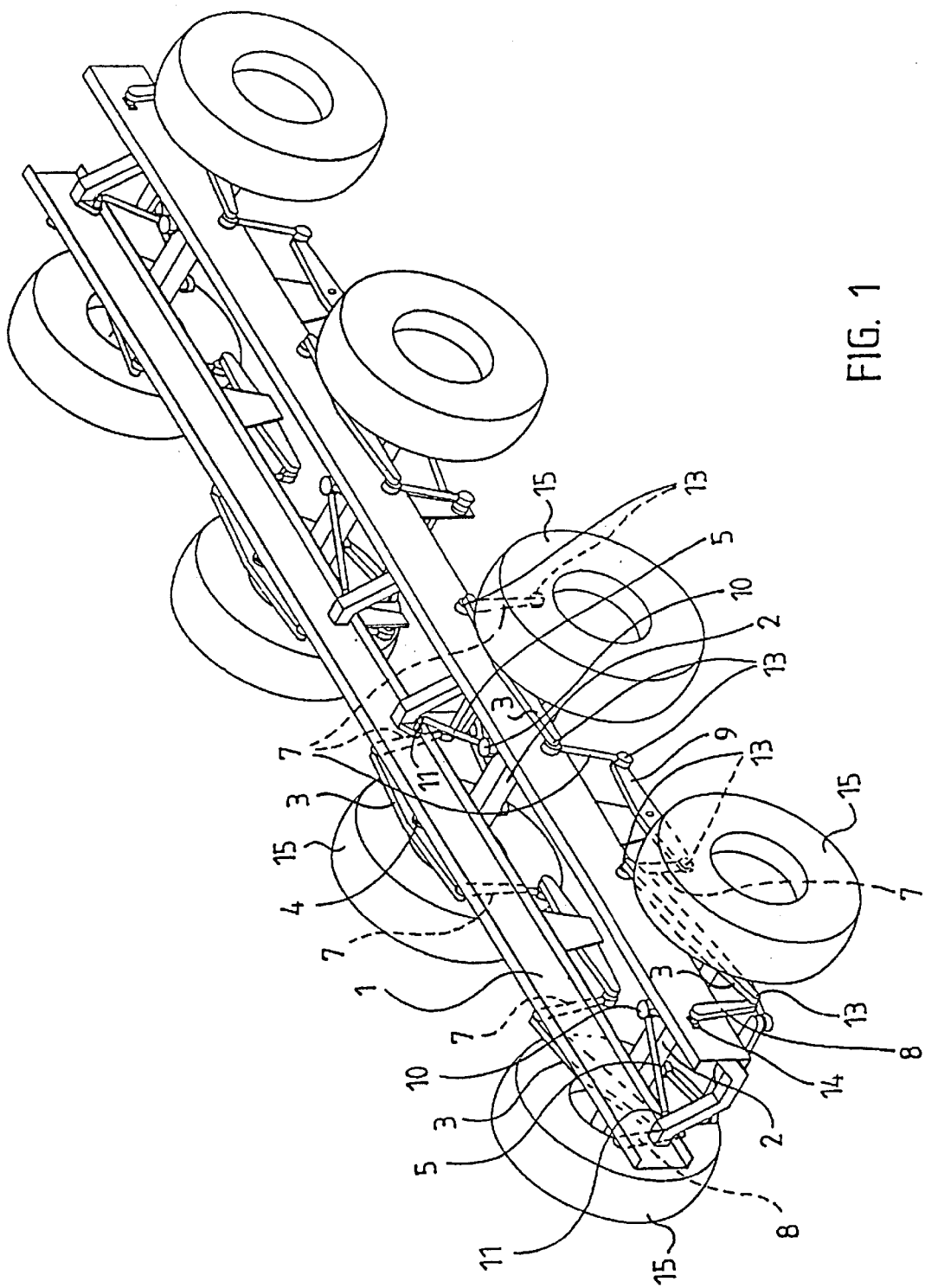
FIG. 1 illustrates a perspective view of the frame construction or a portion of the frame construction of the vehicle comprising two bogies formed by two steerable axle.

The construction according to FIG. 1 comprises a bogie provided with two steerable axles 2 at both ends of a frame 1 or its portion of the vehicle. Only the foremost bogie is illustrated here in more detail as the rearmost bogie is a mirror image of the foremost bogie. The axles 2 can be either tractive or only loaded. However, possible regulating units of the axle 2 are not shown in the figure as they are not essential for the invention.

At the ends of the axles 2 there are wheels 15 which are here shown as single wheels, but which usually in heavy-load axles are twin wheels.

Each axle 2 is supported on the frame 1 by a triangular or V support 5 that is attached at one point by means of a ball joint 10 to the axle 2 and journalled at two places to the opposite sides of the frame 1 with a bearing or a joint 11. This way of support allows the axle 2 to move resiliently in the vertical direction or to pivot in the vertical plane, in addition to which it allows a steering pivoting movement in the horizontal plane, whereas it prevents the movement of the axle 2 sidewardly of the vehicle under certain conditions.

Support means 3 between the beam of axle 2 and the frame 1, which may be rigid levers or springs, such as leaf springs or parabolic springs, are attached centrally or eccentrically to the axle by means of joints 4. The joints 4 allow the axle 2 to turn in the horizontal plane with respect to the support means 3 and the support means 3 to rock with respect to the axle 2.

Suspension means 7 and 8 are arranged at both ends of the support means 3 of the axle 2, the support means 3 being supported on the frame 1 of the vehicle either directly or indirectly by means of the suspension means. In this example, the suspension means 7 between the axles 2 are secured at their upper ends to the support means 3 and at their lower ends to equalizer levers 9 provided on opposite sides of the frame 1, by means of which levers the support means 3 of both axles 2 of the bogie are connected to one another. The rearmost suspension means 7 of the rearmost axle 2 of the bogie are secured at their upper ends to the support means 3, but at their lower ends to the frame 1. The foremost suspension means 8 of the foremost axle 2 are secured between the support means 3 and the frame 1 in such a manner that the suspension means 8 extend essentially upwards from the support means 3 unlike the suspension means 7 that extend downwards from the support means. This unsymmetrical arrangement of the suspension means 7 and 8 of the axle 2 provides the advantages described above and to be described below in connection with FIGS. 3 and 4.

As the joints 4 used here for supporting the axles 2 allow the axles to turn essentially in the horizontal plane with respect to the support means 3, in the unsymmetrical suspension means arrangement described above one end of one suspension means 7 or 8 has to be secured to the frame 1, to the support 3 or to the equalizer lever 9 with a bearing 14 that allows the suspension means 7 or 8 to rotate only essentially in the longitudinal plane of the frame 1 of the vehicle and essentially in the vertical plane with respect to the frame 1, as the forces on the suspension means 7 and 8 do not always center the suspension means 3 in line with the frame in the unsymmetrical suspension means arrangement. In this case the bearings 14 are arranged at the attachment between the upper end of the upwardly extending suspension means 8 and the frame 1 of the vehicle. A ball joint 13 can be used in the attachment of the other ends of the suspension means 7 and 8 in the unsymmetrical suspension means arrangement. The ball joint 13 can, however, be used in the attachment of all ends of the suspension means 7 in a symmetrical suspension means arrangement if the load on the suspension means remains all the time as a traction load, since the turning of the support means 3 with the axle 2 is resisted by force components which depend on the position of the suspension means 7, operate at the ends of the support means 3 and are perpendicular to the direction of the frame 1. By the effect of force symmetry of the force components the support means 3 remains almost parallel to the frame 1. It may also be advantageous in the symmetrical suspension means arrangement if one of the two suspension means 7 secured to the support means 3 is mounted in bearings at its end by a joint that allows the suspension means 7 to rotate only in one plane in order that the position of the support means 3 sidewardly with respect to the frame 1 would be as desired. The change in the direction of the load in the suspension means 7 cannot then turn the support means 3 into a wrong position.

The axle construction described here corresponds in essential parts to the axle construction described in Finnish Patent 89,570 and its corresponding U.S. Pat. No. 5,492,351 except for the above-described unsymmetrical suspension means arrangement realized at least for one axle 2. Therefore, in order to avoid unnecessary repetition, a reference is made to the patent cited above.

The means used for turning the axle 2 are not shown here as the turning can be realized in many ways and the manner of turning is not of essential significance for the invention. One advantageous axle turning system is described in Finnish Patent 84,895, for example.

Figure 2:
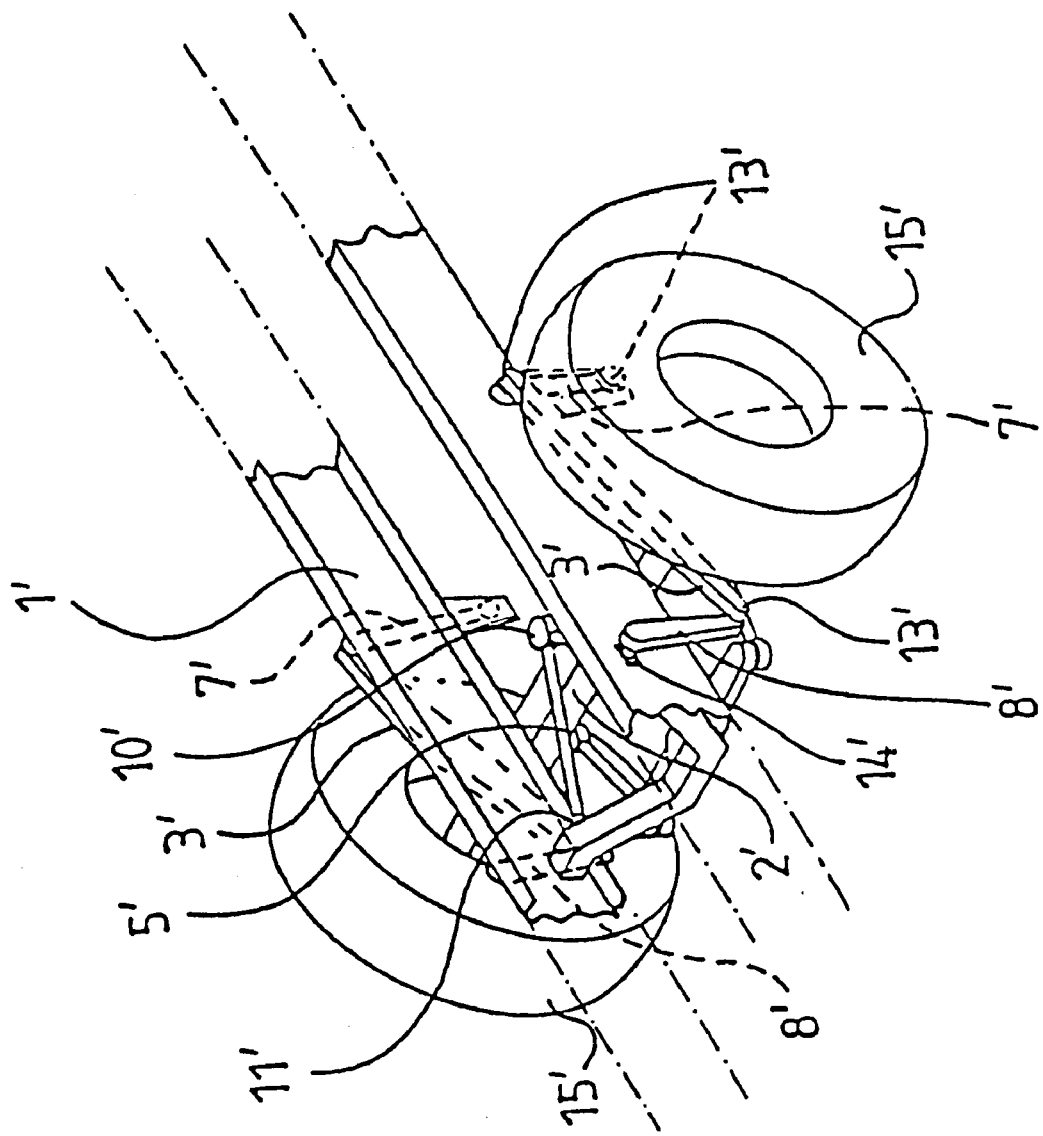
FIG. 2 illustrates a perspective view of the single axle construction according to the invention.

In the construction of FIG. 2 with one (steerable) axle 2', equalizer levers are omitted as being unnecessary, whereby rearmost suspension means 7' extending downwards from the support means 3' are secured to the frame 1' as the rearmost suspension means 7 of the second axle 2 in FIG. 1 and foremost suspension means 8' extending upwards from the support means as the foremost suspension means 8 of the first axle 2 in FIG. 1.

Figure 3:
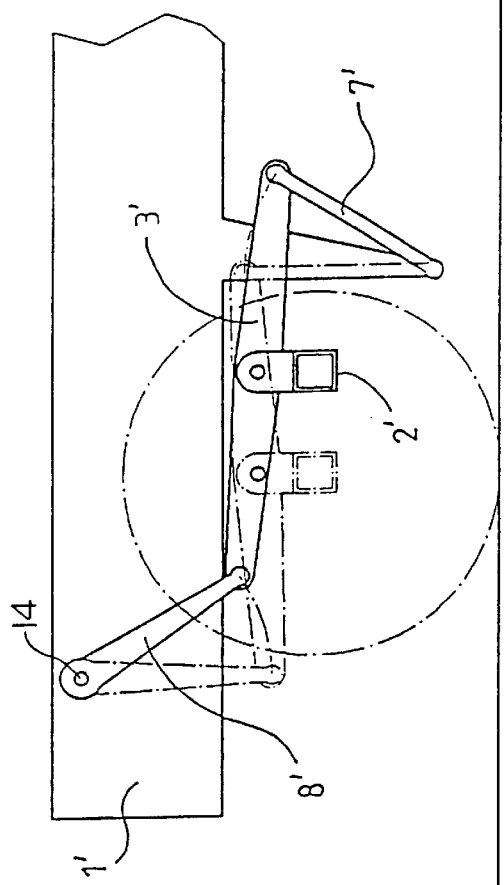
FIG. 3 illustrates a schematic view of the operation of the suspension means arrangement in constructions according to FIGS. 1 and 2.
Figure 4:
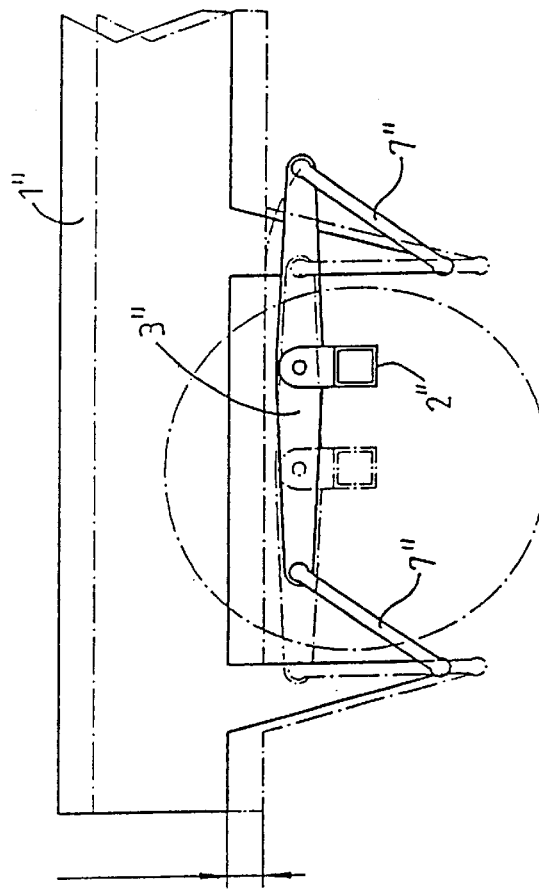
FIG. 4 illustrates a schematic view of the suspension means arrangement of prior art.

FIGS. 3 and 4 illustrate a principal operational difference of the present invention and the prior art suspension means arrangement. In the prior art solution (FIG. 4), the suspension means 7" rotate during turning from their vertical position (shown with a line of dots and dashes), whereby the frame 1" rises because the suspension means 7" go aslant. This is caused by the symmetrical attachment of the suspension means 7" to the frame 1", whereby the support means 3" remains straight and the distance between the attachment of the upper and lower ends of the suspension means 7" shortens perpendicularly with respect to the frame 1". In the solution according to the invention (FIG. 3), wherein the suspension means 8, 8' on one side of the turnable axle 2, 2'—when the axle 2, 2' is viewed in the longitudinal direction—extend essentially upwards from the support means 3, 3' and the suspension means 7, 7' on the other side of the axle essentially downwards, that is, unsymmetrically with respect to the axle 2, 2', the support means 3, 3' turns with respect to the axle in line with the axle 2, 2', where the vertical movements of the frame 1, 1' are smaller. The movement of the frame 1, 1' will be as desired when the suspension means 7, 7' and 8, 8' of the same axle 2, 2' are dimensioned to be of a different length in an appropriate manner, for example.

The arrangement according to the invention is described above by means of only two preferred specific embodiments, but it is to be understood that the invention can be varied without deviating from the restrictions defined in the accompanying claims, and applied to numerous axle constructions, of which only a few possible examples have been mentioned above.

What is claimed is:

1. An axle construction for a vehicle having a frame comprising:
   a rigid axle (2') having opposite ends,
   wheels (15') secured to the ends of the axle (2'),
   support means (3') at both ends of the axle between the axle (2') and the frame (1') of the vehicle, said support means having opposite ends,
   suspension means (7', 8') at both ends of the support means (3') of the axle (2'), the suspension means having opposite ends and being secured at one end to the support means (3') at the other end to the frame (1') of the vehicle, and
   a triangular support (5') attached at one corner by means of a joint centrally to the axle (2') and journalled at two other corners to the frame (1') of the vehicle on opposite sides thereof, whereby the triangular support (5') and the suspension means (7, 8) enable the turnability of the axle,
   wherein the suspension means (8') at one side of the axle (2') when the axle is viewed in the longitudinal direction extends essentially upwards from the support means (3') and is pivotably supported at its upper end to said frame above said support means, the suspension means (7') at the other side of the axle extends essentially downwards, and has a lower end pivotally connected to said frame.

2. An axle construction according to claim 1, whereby the support means (3') is secured to the axle (2') by means of joints (4') that allow the axle to turn essentially in the horizontal plane with respect to the support means and the support means to rock with respect to the axle, said upwardly extending suspension means is secured to the frame (1') by a bearing (14) that allows the suspension means to rotate only essentially in the longitudinal plane of the frame of the vehicle and essentially in a vertical plane with respect to the frame.

3. An axle construction according to claim 1 wherein the essentially upwardly and downwardly extending suspension means (7', 8') are dimensioned to be of a different lengths for effecting a desired movement between the axle (2') and the frame (1').

4. A bogie construction as claimed in claim 1, wherein said support means is connected relative to said frame at an intermediate pivot connection between said opposite ends thereof, the upward and downward suspension means connected to the support means on opposite sides of the axle providing an unsymmetrical connection to minimize vertical travel of the frame when the axle is turned.

5. A bogie construction for a vehicle having a frame comprising:
   first and second rigid axles spaced longitudinally of the vehicle, each axle having opposite ends,
   wheels secured to the ends of the axles,
   support means at both ends of each axle for supporting the axle from the frame,
   said support means at the end of each axle comprises a support member having opposite ends, suspension means at said opposite ends of the support member for supporting the support members from the frame and for interconnecting the support members of the first and second axles, and
   a triangular support having one corner connected to the first axle by a ball joint and two further corners connected by journals to the frame, to enable the first axle to turn relative to the frame,
   said suspension means at the opposite ends of the axles comprising for the first axle a first suspension member at a forward end of the support member at each end of the first axle, said first suspension member having one end pivotally connected to the forward end of the support member and an opposite end pivotally connected to the frame, and a second suspension member having one end pivotally connected to a rearward end of said support member, an equalizer lever pivotally connected to an opposite end of said second suspension member, said first suspension member extending upwardly from the support member to the frame, said second suspension member extending downwardly from said support member to said equalizer lever, said suspension means comprising for the second axle a first suspension member pivotally connected at one end to said equalizer lever and at an opposite end to one end of the support member at the respective end of the second axle, and further suspension members pivotally connecting a second end of said support member at the respective end of the second axle to said frame.

6. A bogie construction as claimed in claim 5, comprising joints connecting the respective support members from the first axle to permit said first axle to turn in a horizontal plane with respect to said support member and said support member to pivot with respect to said first axle, and bearings providing the pivotal connections between the suspension members, the support members and the equalizer levers to permit pivotal movement in a vertical plane extending longitudinally of the frame.

7. A bogie construction as claimed in claim 5, wherein said first suspension member extending upwardly from the respective support member and the second suspension member extending downwardly from the respective support member have different lengths.

8. A bogie construction as claimed in claim 5, wherein said support member for the first axle is connected relative to the frame at an intermediate pivot connection between said forward and rearward ends thereof, said first and second suspension members providing an unsymmetrical connection to said support member to minimize vertical travel of the frame when the front axle is turned.

* * * * *